US011645602B2

(12) United States Patent
Gold et al.

(10) Patent No.: US 11,645,602 B2
(45) Date of Patent: May 9, 2023

(54) SYSTEM FOR ANALYZING WORKFLOW AND DETECTING INACTIVE OPERATORS AND METHODS OF USING THE SAME

(71) Applicant: Vocollect, Inc., Pittsburgh, PA (US)

(72) Inventors: Duff H. Gold, Apollo, PA (US); John Pecorari, Harrison City, PA (US); Christopher L. Lofty, Canonsburg, PA (US)

(73) Assignee: VOCOLLECT, INC., Pittsburgh, PA (US)

(*) Notice: Subject to any disclaimer, the term of this patent is extended or adjusted under 35 U.S.C. 154(b) by 724 days.

(21) Appl. No.: 15/786,971

(22) Filed: Oct. 18, 2017

(65) Prior Publication Data

US 2019/0114572 A1   Apr. 18, 2019

(51) Int. Cl.
*G06Q 30/00* (2012.01)
*G06Q 10/0639* (2023.01)
(Continued)

(52) U.S. Cl.
CPC . *G06Q 10/06398* (2013.01); *G06Q 10/06316* (2013.01); *G06Q 10/063114* (2013.01);
(Continued)

(58) Field of Classification Search
CPC ..... G06Q 10/06398; G06Q 10/063114; G06Q 10/06316; G10L 15/22; G10L 15/26; G10L 15/265; G10L 2015/223
See application file for complete search history.

(56) References Cited

U.S. PATENT DOCUMENTS 6,065,138 A   5/2000 Gould et al.
6,170,011 B1 * 1/2001 Macleod Beck ...... G06Q 10/06
                                                   709/224
(Continued)

FOREIGN PATENT DOCUMENTS

EP            3 001 368 A1      3/2016
WO       WO 2015/127491 A1      9/2015
WO       WO-2018183272 A1 * 10/2018 ..... G06Q 10/063114

OTHER PUBLICATIONS

In re: DiPiazza; U.S. Provisional Application titled Distributed Headset with Electronics Module; U.S. Appl. No. 62/097,480, filed Dec. 29, 2014.
(Continued)

*Primary Examiner* — Patricia H Munson
*Assistant Examiner* — Uche Byrd
(74) *Attorney, Agent, or Firm* — Alston & Bird LLP

(57) ABSTRACT

Provided is an improved apparatus and method for identifying inefficient workers in a workplace. The apparatus receives voice commands from a worker in the workplace and transforms the voice commands into text commands by converting audio signals associated with the voice commands to one or more points in data that are stored in a database. The apparatus further creates a dialogue-stream including the text commands and a time of receipt of each voice command associated with the respective text command. Further, a workflow record may be created from the dialogue-stream and may be used to generate an efficiency metric for the worker. Both the dialogue-stream and workflow record can be used to monitor the efficiency of the worker and implement effective changes to the workflow process.

25 Claims, 9 Drawing Sheets

(51) Int. Cl.
  *G06Q 10/0631* (2023.01)
  *G10L 15/22* (2006.01)
  *G10L 15/26* (2006.01)

(52) U.S. Cl.
  CPC .............. *G10L 15/22* (2013.01); *G10L 15/26* (2013.01); *G10L 2015/223* (2013.01)

(56) References Cited

U.S. PATENT DOCUMENTS

| | | | |
|---|---|---|---|
| 6,359,557 | B2 | 3/2002 | Bilder |
| 8,659,397 | B2* | 2/2014 | Vargo ................. G06K 7/10297 340/10.4 |
| 9,171,445 | B2 | 10/2015 | Nishihara et al. |
| 9,843,660 | B2 | 12/2017 | DiPiazza et al. |
| 2002/0042786 | A1* | 4/2002 | Scarborough .......... G06Q 10/10 706/21 |
| 2009/0012760 | A1* | 1/2009 | Schunemann ..... G06Q 10/0639 703/6 |
| 2010/0036667 | A1* | 2/2010 | Byford .................... G10L 15/22 704/270 |
| 2010/0177076 | A1* | 7/2010 | Essinger ............. G09G 3/3433 345/207 |
| 2013/0179236 | A1* | 7/2013 | Hicyilmaz ........ G06Q 10/06398 705/7.42 |
| 2013/0226651 | A1* | 8/2013 | Napper .................. G06Q 30/06 705/7.26 |
| 2015/0142491 | A1* | 5/2015 | Webb ............. G06Q 10/063114 705/7.15 |
| 2016/0042737 | A1 | 2/2016 | Emerick et al. |
| 2016/0071032 | A1* | 3/2016 | Hunter ............... G06Q 10/0631 705/7.12 |
| 2016/0078390 | A1* | 3/2016 | Grewal ............ G06Q 10/06398 705/7.42 |
| 2016/0092805 | A1* | 3/2016 | Geisler ............. G06Q 10/0633 705/7.27 |
| 2016/0125895 | A1 | 5/2016 | Gandhi et al. |
| 2016/0203429 | A1 | 7/2016 | Mellot et al. |
| 2017/0200108 | A1* | 7/2017 | Au ................... G06Q 10/06398 |
| 2019/0370721 | A1* | 12/2019 | Issac ............... G06Q 10/06398 |

OTHER PUBLICATIONS

In re: DiPiazza; U.S. Provisional Application titled Tag Mounted Electronics Module for Distributed Headset; U.S. Appl. No. 62/101,568, filed Jan. 9, 2015.

* cited by examiner

SYSTEM FOR ANALYZING WORKFLOW AND DETECTING INACTIVE OPERATORS AND METHODS OF USING THE SAME

BACKGROUND

Management has little visibility into the actual activity on the floor of a company where work is being done. Whether in a warehouse, manufacturing facility, retail store, etc., supervisors and other management personnel have a difficult time monitoring daily activities of the respective business, particularly when dealing with larger facilities with numerous employees. However, it is in these daily activities where costs can rise and efficiencies can decrease.

Applicant has identified a number of deficiencies and problems associated with conventional systems and associated devices and methods for capturing workflow performance. Through applied effort, ingenuity, and innovation, many of these identified problems have been solved by developing solutions that are included in embodiments of the present invention, many examples of which are described in detail herein.

SUMMARY

The present disclosure relates to system and method for identifying inefficient workers in a workplace. In a first exemplary embodiment, a voice controlled apparatus to identify inefficient workers in a workplace is provided. The voice controlled apparatus may include a processor. The processor may receive voice commands from a worker in the workplace. The processor may further transform the voice commands into text commands by converting audio signals associated with the voice commands to one or more points in data that are stored in a database. The processor may create a dialogue-stream including the text commands and a time of receipt of each voice command associated with the respective text command. The processor may cause the dialogue-stream to be transmitted to a server. Further, a workflow record may be created from the dialogue-stream and may be used to generate an efficiency metric. The workflow record may include individual tasks and may be created by identifying a task associated with any one of the voice commands. The task may indicate that the worker has at least started to perform the task and the task is related to an efficiency of the worker.

In some embodiments, a dialogue-stream including the text commands and a time of receipt of each voice command associated with the respective text command may be gathered into a single collection organized by the time of receipt. Such gathering and organizing may be performed by the processor and/or another device, system, or component. For instance, a back-end server or cloud based system may receive the dialogue-stream and organize and collect the text commands by time of receipt (of the associated voice command at the user device).

In some embodiments, the processor may receive button commands manually inputted by the worker in the workplace. The processor may incorporate the button commands into the text commands by identifying one or more points in data stored in the database or another database related to each of the button commands. The processor may further incorporate the text commands from the button commands into the dialogue-stream and/or another device, system, or component may do so. For instance, a back-end server or cloud based system may receive the text command associated with the button command and organize the text command by time of receipt (of the associated button command at the user device) into the dialogue-stream.

In some embodiments, the processor may provide speech to the worker by converting one or more points in data to one or more audio signals to be converted to speech via a speaker.

In some embodiments, the voice controlled apparatus may further include a microphone and a speaker.

In some embodiments, the processor may further cause the dialogue-stream to be transmitted to a supervisor device. The supervisor device may be controlled by a supervisor of the worker.

In some embodiments, the dialogue-stream may be used to prepare one or more alarms associated with a maximum duration of a particular task of the workflow record.

In some embodiments, the dialogue-stream may be further used to determine the rate of interaction of the worker with the apparatus.

In further embodiments, the dialogue-stream may be further used to identify periods of non-activity of the worker with the apparatus.

The present disclosure further relates to a method of identifying inefficient workers in a workplace. The method may include receiving a dialogue-stream from a user device. The dialogue-stream may include text commands and a time associated with each text command. Further, the text commands may be formed by transforming voice commands from a particular user into the text commands by converting audio signals associated with the voice commands to one or more points in data that are stored in a database. The method may further include creating a workflow record for the particular user by identifying a task associated with any one of the voice commands from the particular user based on each text command associated with the respective voice command and determining a duration of the task. Further, the workflow record may be used to generate an efficiency metric.

The method may include gathering the text commands into a single collection organized by time of receipt of the associated voice command and/or button command.

In some embodiments, the method may further include recognizing tags in the dialogue-stream. The tags may indicate that an associated text command in the dialogue-stream originated from a user as opposed to the user device. Further, the method may include removing items in the dialogue-stream that are not associated with the tags to create a user-initiated dialogue-stream. In some embodiments, the method may further include determining a rate of interaction of the particular user by calculating a number of text commands over a period of time in the user-initiated dialogue-stream.

In some embodiments, identifying a task associated with any one of the voice commands from the particular user based on each text command associated with the respective voice command may include determining a current state of the user device, determining a next state of the user device, identifying a trigger to move to the next state of the user device, and adding the task to the workflow record after identifying the trigger. In some embodiments, the current state may be determined by the earliest received voice command and associated text command or a voice command received from the user device that has not been associated with at least one task. The next state may be determined by identifying a task intended to follow the current state from the database or another database. Further, the trigger may include a dialogue of interest related to the next state.

In some embodiments, determining the duration of the at least one task may include identifying a text command or a voice command received from the user device in the dialogue-stream associated with a start of the task in the database or another database, identifying a text command or a voice command received from the user device in the dialogue-stream associated with an end of the task in the database or another database, and determining a time between the start of the task and the end of the task.

In some embodiments, the method may further include determining an average duration or central tendency of the duration of tasks associated with the voice commands by averaging the duration of each task over a statistically significant number of repetitions of the task.

In some embodiments, the method may further include creating an alarm associated with the task. The alarm may notify a supervisor device that the particular user has exceeded a maximum duration of the task by causing an indication to be transmitted to the supervisor device when the duration of the task exceeds the maximum duration of the task in the workflow record.

In some embodiments, the method may further include transmitting the workflow record for the particular user to be transmitted to a supervisor device, wherein the supervisor device is controlled by a supervisor of the user.

In some embodiments, the method may further include receiving dialogue-streams from user devices. Each dialogue-stream may include text commands and a time associated with each text command. The text commands may be formed by transforming voice commands into the text commands by converting audio signals associated with the voice commands to one or more points in data that are stored in the database or another database. The method may further include creating a workflow records for the users by identifying a task for a voice command in each workflow record and determining a duration of each task of each workflow record, and comparing the duration of each task of each workflow record.

In some embodiments, the method may further include filtering the workflow records for a single task, and determining an average duration of the single task over the workflow records, a minimum duration of the single task over the workflow records, or a maximum duration of the single task over the workflow records. In some embodiments, the method may further include creating an alarm associated with the single task. The alarm may notify a supervisor device that a user has exceeded a set duration of the single task by transmitting an indication to the supervisor device when the duration of the single task exceeds the set duration in the workflow record of the user. The alarm may notify a supervisor device that a user's average duration for the task has exceeded a set duration of the task by transmitting an indication to the supervisor device when the average duration of the task exceeds the set duration in the workflow record of the user. In some embodiments, the alarm may be transmitted to the user device.

In some embodiments, the method may further include identifying a period of non-activity of a particular user by identifying a period of time where the rate of interaction decreases to a defined value and causing an indication to be transmitted to a supervisor device notifying a supervisor of the particular user of the occurrence of the period of non-activity.

The present disclosure further relates to a method of identifying inefficient workers in a workplace. The method may include receiving a workflow record from a user device or a server. The workflow record may include text commands and a time associated with each text command. The text commands may be formed by transforming voice commands into the text commands by converting audio signals associated with the voice commands to one or more points in data that are stored in a database. Further, the workflow record may be used to generate an efficiency metric. The method may further include acknowledging receipt of the workflow record and creating an alarm associated with a task performed in the workflow record. The alarm may notify a supervisor device that a user has exceeded a set duration of the task and/or that the user's average duration for the task has exceeded a set duration or limit on the duration of the task. The method may include transmitting an indication to the supervisor device when the duration of the task exceeds the set duration in the workflow record, or initiating an action to improve the workflow record and incorporating a note to the workflow record recording the initiated action.

In some embodiments, the workflow record may include tasks associated with the text commands and each task may be associated with a duration of the respective task.

In some embodiments, the acknowledging receipt of the workflow record may include transmitting an indication to the user device or server from which the workflow record was received, the indication indicating that the workflow record was received.

In some embodiments, the set duration may be derived from or related to an average duration of the task as performed by users.

In some embodiments, the action to improve the workflow record may include notifying a particular user that the particular user is inefficient by causing an indication to be transmitted to the particular user device operated by the particular user, the indication indicating that the particular user is inefficient.

In some embodiments, the action to improve the workflow record may include requesting additional materials, workers, or a combination thereof to perform the task by transmitting an indication to a server, the indication indicating that additional materials, workers, or a combination thereof are needed to perform the task.

The above summary is provided merely for purposes of summarizing some example embodiments illustrating some aspects of the present invention. Accordingly, it will be appreciated that the above-described embodiments are merely examples and should not be construed to narrow the scope or spirit of the invention in any way. It will be appreciated that the scope of the invention encompasses many potential embodiments in addition to those herein summarized, some of which will be further described below.

BRIEF DESCRIPTION OF THE DRAWINGS

The accompanying drawings illustrate embodiments of the invention, and, together with the specification, including the general description above and the detailed description which follows, serve to explain the features of the present invention.

DETAILED DESCRIPTION

Figure 1:
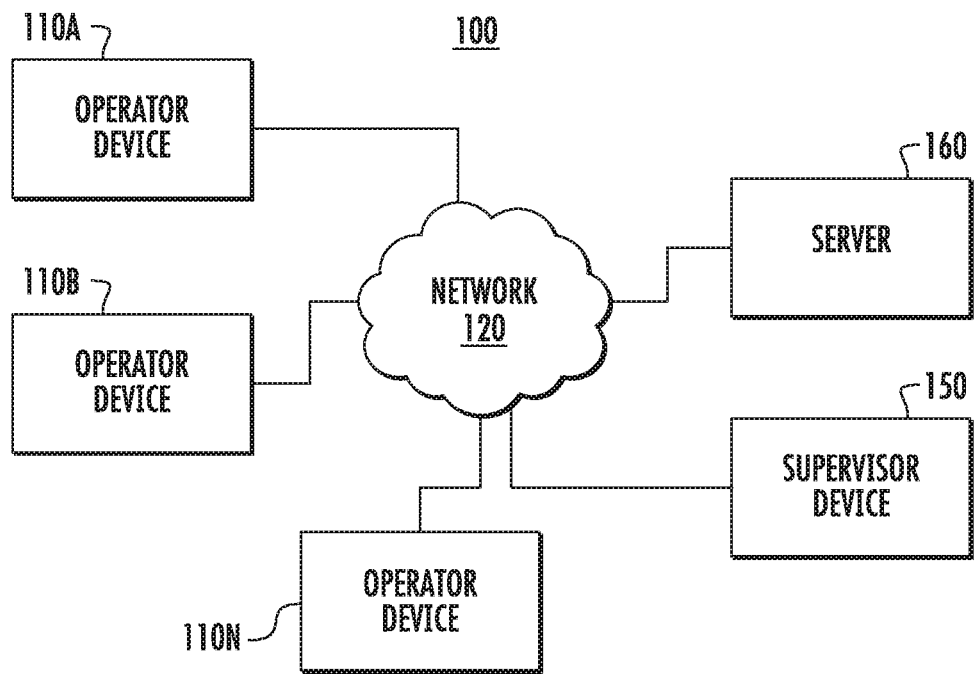
FIG. 1 illustrates a schematic of a workflow performance system according to an example embodiment.

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," "outside," "inside," etc. are used for explanatory purposes in the examples provided below to describe the relative position of certain devices or portions of devices. Terminology used in this patent is not meant to be limiting insofar as devices described herein, or portions thereof, may be attached or utilized in other orientations.

The term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

The terms "about" or "approximately" or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

As used herein, the term "transmitter" refers to any component that can generate radio waves for communication purposes while a "receiver" is used to generally refer to any component that can receive radio waves and convert the information into useable form. A "transceiver" generally refers to a component that can both generate radio waves and receive radio waves and is thus contemplated when either a transmitter or a receiver is discussed.

The term "processor" is used herein to refer to any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. The memory can also be located internal to another computing resource (e.g., enabling computer readable instructions to be downloaded over the Internet or another wired or wireless connection).

For the purposes of this description, a general reference to "memory" refers to memory accessible by the processors including internal memory or removable memory plugged into the device and memory within the processors themselves. For instance, memory may be any non-transitory computer readable medium having computer readable instructions (e.g., computer program instructions) stored thereof that are executable by a processor.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphone, headset, smartwatch, and similar electronic devices equipped with at least a processor configured to perform the various operations described herein. Devices such as smartphones, tablets, headsets, and smartwatches are generally collectively referred to as mobile devices.

The term "server" is used to refer to any computing device capable of functioning as a server, such as a master exchange server, web server, mail server, document server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

In a workplace environment, an employee or a worker is often assigned a set of tasks and/or a job to work upon which is overseen by a supervisor or a manager to monitor the worker's performance and productivity. However, since a supervisor may have a high number of workers to monitor and/or may have other responsibilities or duties to tend to, there is generally a lack of visibility or ability to supervise all workers effectively. In light of these problems in oversight by supervisors, workers may be tempted to remain inactive or idle, and/or may work slower than desired by management. Thus, there is a need for better worksite monitoring, and specifically, to track periods of inactivity by a worker.

The present disclosure relates to a method for identifying inefficient workers in a workplace. In a task based workflow solution, a worker and/or a user may interact with a user device throughout, periodically, or at specific intervals while performing the task. For example, a user may receive specific instructions or voice commands from a user device, such as a headset, for executing a task. In response, the user may provide inputs, such as speech inputs, to the user device as requested. Thus, a user may be required to provide inputs to the user device periodically for executing the workflow task efficiently. Hence, if a user does not interact with the user device as expected, or within a specific duration, it may be determined that the user might be inactive and/or working slower than desired. The present disclosure provides systems and methods for monitoring the interaction between the user and the user device to identify inefficient workers. Specifically, a dialogue-stream of worker activities may be created based on the voice commands received from each worker and a time of receipt of each voice command. The dialogue-stream may be analyzed and transformed into a workflow record. The workflow record may be used to determine an efficiency of the worker related to a given task and/or sub-task. Specifically, the dialogue-stream and workflow record may provide information regarding a duration of time taken by the worker to complete the task and/or the sub-task, rate of activity of the worker, and the like. Further, alarms and/or alerts may be provided to a supervisor and/or other management positions when an efficiency parameter falls outside of the parameters or thresholds set to define an efficient worker. The supervisor may then take an appropriate action to maintain employee productivity to desired levels. Thus, the present disclosure provides efficient workplace monitoring methods and systems.

The components illustrated in the figures represent components that may or may not be present in various embodiments of the invention described herein such that embodiments may include fewer or more components than those shown in the figures while not departing from the scope of the invention.

While the present disclosure focuses on workflow performance systems generally in an employment setting, one or more embodiments of the present disclosure may be used for other purposes or in other environments, such as to connect people of other organizations, families, schools, etc. and provide visibility of performance or activity to those involved. The present disclosure may be particularly beneficial when it is desired to connect remote users or provide access to information to remote users that are not able to physically witness a person's performance or activity.

FIG. 1 shows system 100 including an example network architecture for a system, which may include one or more devices and sub-systems that are configured to implement some embodiments discussed herein. For example, system 100 may include server 160, which can include, for example, the circuitry disclosed in FIGS. 2-4, a server, or database, among other things (not shown). The server 160 may include any suitable network server and/or other type of processing device. In some embodiments, the server 160 may receive requests and transmit information or indications regarding such requests to operator devices 110A-110N and/or one or more supervisor devices 150.

Server 160 can communicate with one or more operator devices 110A-110N and/or one or more supervisor devices 150 via network 120. In this regard, network 120 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 120 may include a cellular telephone, an 802.11, 802.16, 802.20, and/or WiMax network. In some embodiments, Bluetooth may be used to communicate between devices. Further, the network 120 may include a public network, such as the Internet, a private network, such as an intranet, or combinations thereof, and may utilize a variety of networking protocols now available or later developed including, but not limited to TCP/IP based networking protocols.

Operator devices 110A-110N, supervisor device 150, and/or server 160 may each be implemented as a computing device, such as a personal computer and/or other networked device, such as a cellular phone, tablet computer, mobile device, point of sale terminal, inventory management terminal etc., that may be used for any suitable purpose in addition to presenting the interface to facilitate buying items and/or offering items for sale. The depiction in FIG. 1 of "N" members is merely for illustration purposes. Further, while only one supervisor device 150 is illustrated in FIG. 1, in some embodiments, multiple or a plurality of supervisor devices 150 may be connected in the system. Any number of users, operators, or supervisors may be included in the system 100. In one embodiment, the operator devices 110A-110N and/or supervisor devices 150 may be configured to display an interface on a display of the respective device for viewing, creating, editing, and/or otherwise interacting with the server. According to some embodiments, the server 160 may be configured to display the interface on a display of the server 160 for viewing, creating, editing, and/or otherwise interacting with information on the server 160. In some embodiments, an interface of operator devices 110A-110N and/or supervisor device 150 may be different from an interface of a server 160. Various components of the present system may be performed on one or more of the operator devices 110A-110N, supervisor device 150, or server 160. System 100 may also include additional client devices and/or servers, among other things.

Figure 2:
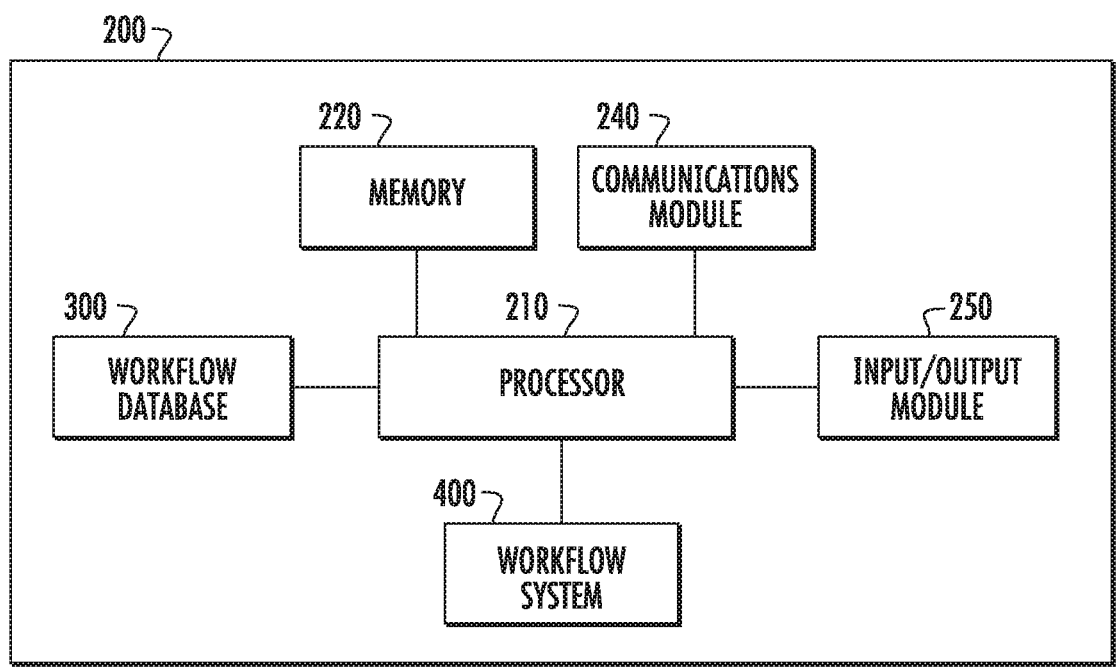
FIG. 2 illustrates a schematic block diagram of a workflow performance system according to an example embodiment.

FIG. 2 shows a schematic block diagram of circuitry 200, some or all of which may be included in, for example, operator devices 110A-110N, supervisor device 150, and/or server 160. Any of the aforementioned systems or devices may include the circuitry 200 and may be configured to, either independently or jointly with other devices in a network 120 perform the functions of the circuitry 200 described herein. As illustrated in FIG. 2, in accordance with some example embodiments, circuitry 200 can includes various means, such as processor 210, memory 220, communications module 240, and/or input/output module 250. In some embodiments, workflow database 300 and/or workflow system 400 may also or instead be included. As referred to herein, "module" includes hardware, software and/or firmware configured to perform one or more particular functions. In this regard, the means of circuitry 200 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 220) that is executable by a suitably configured processing device (e.g., processor 210), or some combination thereof.

Processor 210 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments processor 210 comprises a plurality of processors. The plurality of processors may be embodied on a single computing device or may be distributed across a plurality of computing devices collectively configured to function as circuitry 200. The plurality of processors may be in operative communication with each other and may be collectively configured to perform one or more functionalities of circuitry 200 as described herein. In an example embodiment, processor 210 is configured to execute instructions stored in memory 220 or otherwise accessible to processor 210. These instructions, when executed by processor 210, may cause circuitry 200 to perform one or more of the functionalities of circuitry 200 as described herein.

Whether configured by hardware, firmware/software methods, or by a combination thereof, processor 210 may comprise an entity capable of performing operations according to embodiments of the present invention while configured accordingly. Thus, for example, when processor 210 is embodied as an ASIC, FPGA or the like, processor 210 may comprise specifically configured hardware for conducting one or more operations described herein. Alternatively, as another example, when processor 210 is embodied as an executor of instructions, such as may be stored in memory 220, the instructions may specifically configure processor 210 to perform one or more algorithms and operations described herein, such as those discussed in connection with FIGS. 1-10.

Memory 220 may comprise, for example, volatile memory, non-volatile memory, or some combination thereof. Although illustrated in FIG. 2 as a single memory, memory 220 may comprise a plurality of memory components. The plurality of memory components may be embodied on a single computing device or distributed across a plurality of computing devices. In various embodiments, memory 220 may comprise, for example, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. Memory 220 may be configured to store information, data (including item data and/or profile data), applications, instructions, or the like for enabling circuitry 200 to carry out various functions in accordance with example embodiments of the present invention. For example, in at least some embodiments, memory 220 is configured to buffer input data for processing by processor 210. Additionally or alternatively, in at least some embodiments, memory 220 is configured to store program instructions for execution by processor 210. Memory 220 may store information in the form of static and/or dynamic information. This stored information may be stored and/or used by circuitry 200 during the course of performing its functionalities.

Communications module 240 may be embodied as any device or means embodied in circuitry, hardware, a computer program product comprising computer readable program instructions stored on a computer readable medium (e.g., memory 220) and executed by a processing device (e.g., processor 210), or a combination thereof that is configured to receive and/or transmit data from/to another device and/or network, such as, for example, a second circuitry 200 and/or the like. In some embodiments, communications module 240 (like other components discussed herein) can be at least partially embodied as or otherwise controlled by processor 210. In this regard, communications module 240 may be in communication with processor 210, such as via a bus. Communications module 240 may include, for example, an antenna, a transmitter, a receiver, a transceiver, network interface card and/or supporting hardware and/or firmware/software for enabling communications with another computing device. Communications module 240 may be configured to receive and/or transmit any data that may be stored by memory 220 using any protocol that may be used for communications between computing devices. Communications module 240 may additionally or alternatively be in communication with the memory 220, input/output module 250 and/or any other component of circuitry 200, such as via a bus.

Input/output module 250 may be in communication with processor 210 to receive an indication of a user input and/or to provide an audible, visual, mechanical, or other output to a user (e.g., employee and/or worker). Some example visual outputs that may be provided to a user by circuitry 200 are discussed in connection with FIGS. 1-10. In accordance with an aspect of the present disclosure, the input/output module 250 may request an input from a user and/or a worker. In response, the worker may provide a voice command. The term "voice command" as used herein may refer to audio and/or speech inputs received from a user as part of a workflow task or audio and/or speech outputs provided to a user. For example, in a palletizing application, the input/output module 250, such as a speaker and/or a display, may request a user to provide a pallet size needed for creating a palletizing pattern. In response, the worker may provide a voice command through the input/output module 250, such as a microphone. Additionally and/or alternatively, the worker may provide input through button commands manually inputted by the worker. The input/output module 250, the processor 210, and/or the workflow system 400 may additionally record a time of receipt of the input from the worker. Further, the voice commands and/or the button commands may be processed by the processor 210 and/or the workflow system 400 to create corresponding text commands. The term "text command" as used herein may refer to digital data created by converting the voice commands to points in data stored in a database. Specifically, the processor 210 and/or any other circuitry may digitize received voice command, and then may perform processing, such as, sampling, filtering, recognition, and the like, to match keywords and/or data points in the voice command with data stored in a database, to generate a text command corresponding to the voice command. FIG. 8 provides further details on the processing of voice command, as will be described later.

The processor 210 and/or the workflow system 400 may further create a dialogue-stream based on the text command and corresponding time of receipt of the inputs from the worker. The term "dialogue-stream" as used herein may refer to one or more time-stamped interactions between the worker and the associated device. The dialogue-stream may include all the text commands converted from voice commands, along with the time of receipt of the voice command. For example, the worker may provide a voice command input to the request for providing pallet size, as, "800 by 600 by 163." This voice command may be time-stamped and stored as a dialogue stream for further processing.

As such, input/output module 250 may include support, for example, for a keyboard, a mouse, a joystick, a display, a touch screen display, a microphone, a speaker, a RFID reader, barcode reader, biometric scanner, and/or other input/output mechanisms. In embodiments wherein input/output module 250 is embodied as a server or database, aspects of input/output module 250 may be reduced as compared to embodiments where input/output module 250 is implemented in an end-user machine (e.g., operator device and/or supervisor device) or other type of devices designed for complex user interactions. In some embodiments (like other components discussed herein), input/output module 250 may even be eliminated from circuitry 200. Alternatively, such as in embodiments wherein some aspects of circuitry 200 is embodied as a server or database, at least some aspects of input/output module 250 may be embodied on an apparatus used by a user that is in communication with the rest of circuitry 200. Input/output module 250 may be in communication with the memory 220, communications module 240, and/or any other component(s), such as via a bus. One or more than one input/output module and/or other component can be included in circuitry 200.

The workflow database 300 and the workflow system 400 may also or instead be included and configured to perform the functionality discussed herein related to workflow performance. In some embodiments, some or all of the functionality of generating information for workflow performance may be performed by processor 210. In this regard, the example processes and algorithms discussed herein can be performed by at least one processor 210, workflow database 300, and/or workflow system 400. For example, non-transitory computer readable media can be configured to store firmware, one or more application programs, and/or other software, which include instructions and other computer-readable program code portions that can be executed to control each processor (e.g., processor 210, workflow database 300, and/or workflow system 400) of the components of circuitry 200 to implement various operations, including the examples shown above. As such, a series of computer-readable program code portions are embodied in one or more computer program goods and can be used, with a computing device, server, and/or other programmable apparatus, to produce machine-implemented processes.

Figure 3:
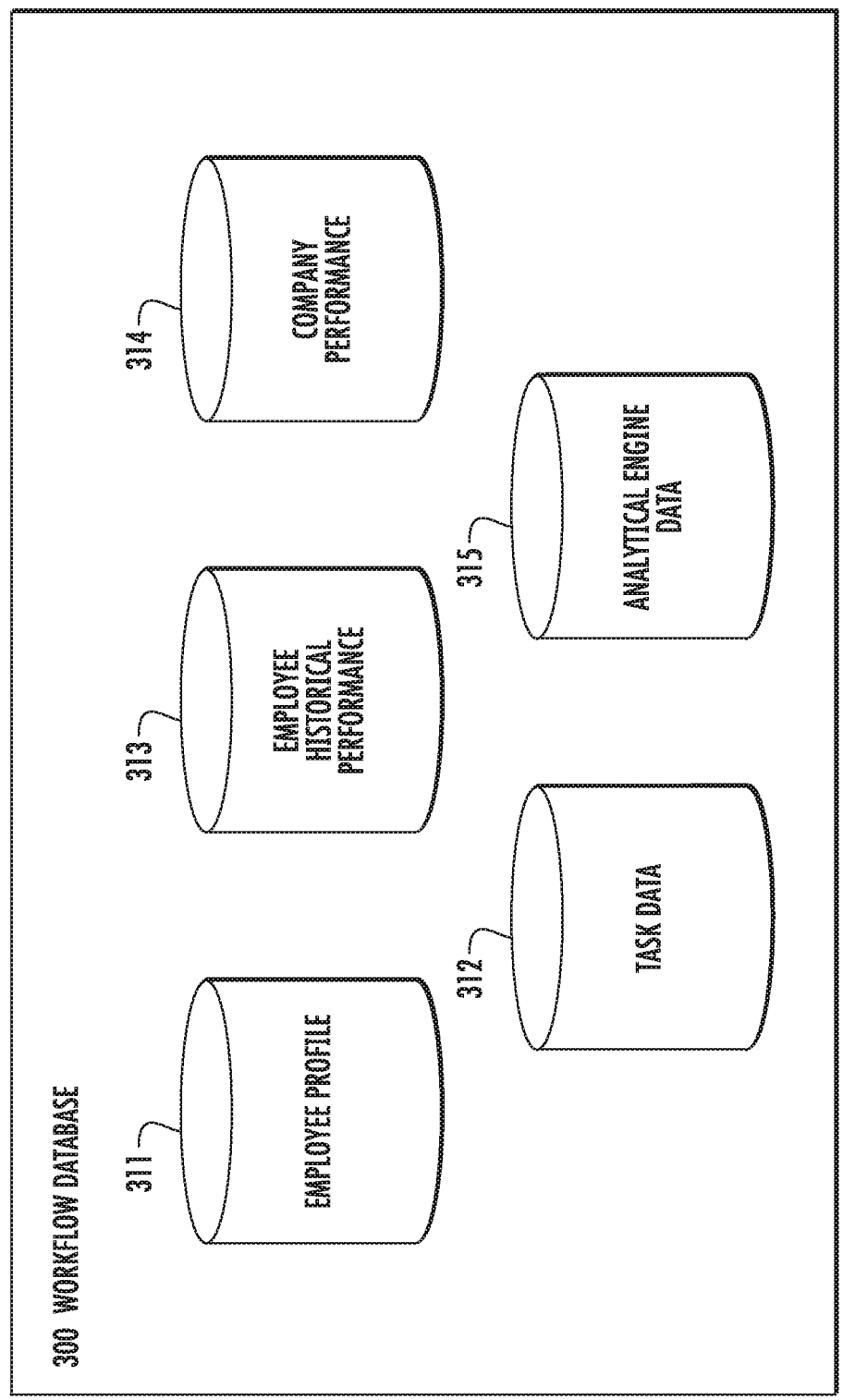
FIG. 3 illustrates a schematic block diagram of a workflow database according to an example embodiment.

In some embodiments, a workflow database 300 may be provided that includes various relevant information for the workflow performance system. For instance, as shown in FIG. 3, in this embodiment, the workflow database 300 includes employee data 311, task data 312, employee historical performance data 313, and company performance data 314. Various other data may be included in the workflow database 300. As additional tasks are performed, the system 200 may receive additional information regarding the tasks and the employee (e.g., performance information), which may be stored in the workflow database 300. In addition, as additional information is developed regarding products and/or services provided by the company, the system 200 may receive this additional information and store the information in the workflow database 300 with distinct tasks for handling (e.g., manufacturing or processing) such products or services for future use. Additionally or alternatively, the workflow database 300 may include analytical engine data 315 which provides any additional information needed by the workflow system 400 in analyzing inputs and requests and generating the appropriate response.

For example, workflow system 400 can be configured to analyze multiple sets of data (e.g., including various combinations of employee data, task data, employee historical performance data, company data, etc.), such as the data in the workflow database 300. In this way, the workflow system 400 may support multiple algorithms, including those discussed below with respect to employee data, task data, employee historical performance data, company data, etc., so that the selected algorithm may be chosen at runtime. Further, the present configuration can enable flexibility in terms of configuring additional contexts.

Figure 4:
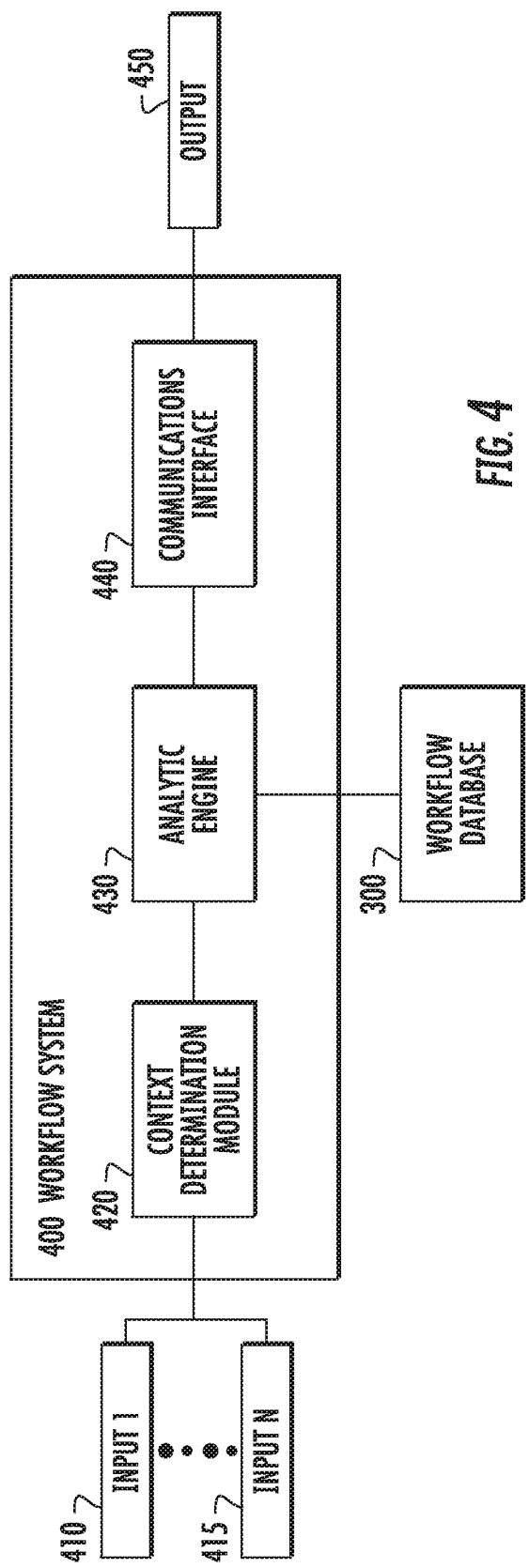
FIG. 4 illustrates a schematic block diagram of a workflow system according to an example embodiment.

In some embodiments, with reference to FIG. 4, the workflow system 400 may include a context determination module 420, analytical engine 430, and communications interface 440, all of which may be in communication with the workflow database 300. The workflow system 400 may receive one or more inputs or requests (e.g., voice commands) and may generate an appropriate response. The workflow system 400 may use any of the algorithms or processes disclosed herein for receiving a request/input and generating a response. In some other embodiments, such as when the circuitry 200 is embodied in a server 160, supervisor device 150, and/or operator devices 110A-110N, the workflow system 400 may be located in another circuitry 200 or another device, such as another server 160, supervisor device 150, and/or operator devices 110A-110N.

The workflow system 400 can be configured to access data corresponding to one or more employees and products/services (by way of tasks), and generate one or more responses and/or indications. In accordance with an aspect of the present disclosure, the workflow system 400 and/or the processor 210 may receive one or more voice commands and prepare an associated dialogue-stream, as described above. A dialogue stream may include device and/or system initiated events and user inputs and/or actions, referred to here as 'user-initiated events.' The workflow system 400 and/or the processor 210 may filter the dialogue-stream for user-initiated events. Further, a workflow record may be created from the dialogue-stream based on the associated tasks and sub-tasks. In an embodiment, the workflow record may be analyzed by the workflow system 400 and/or the processor 210 to monitor worker efficiency, such as, but not limited to, duration of tasks and/or sub-tasks, rate of interaction with the device, duration of a task, and the like. The term "duration of a task" may refer to time between the start of a task and the end of the task in the database. Further, "average duration" may refer to an average time spent on a task by one or more workers. In some embodiments, the method may further include determining an average duration of tasks associated with the voice commands by averaging the duration of each task over a statistically significant number of repetitions of the task. The average duration may be a weighted average, arithmetic mean, geometric mean, harmonic mean, quadratic mean, mode, median, etc. Centroids and clustering algorithms may also be used. As used herein, "average duration" is generally used to refer to a duration calculated based on more than one duration and may be used, in some embodiments, to determine a "set duration" or baseline for comparing the duration of one or more tasks. Additional calculations may be made and incorporated into determining the set duration or baseline for comparing durations of tasks. For instance, other statistical information (e.g., standard deviation, etc) may be calculated. The workflow system 400 and/or the processor 210 may also monitor a time spent between adjacent tasks. The term "adjacent task(s)" may refer to two tasks in a workflow solution, such that one of the adjacent tasks is performed prior to the other adjacent task with no intervening task. Further, if one or more of the worker efficiency parameters are outside of the parameters or thresholds set to define an efficient worker, a supervisor and/or a manager may be notified of the inefficient worker. The parameters or thresholds set to define an efficient worker may be respective to the efficiency parameters and may be determined prior to start of the task or may be a running calculation based on the task and/or other tasks. Additionally and/or alternatively, a supervisor device may receive the dialogue-stream and/or the workflow record for monitoring efficiency and productivity of workers.

With reference to FIG. 4, whether used locally or over a network, the workflow system 400 may be used to analyze the workflow performance, identify tasks and subtasks, create alarms associated with the tasks and subtasks, and notify supervisors or management as to the relevant tasks/subtasks or employee's work performance. The system may receive a plurality of inputs 410, 415 from the circuitry 200 (e.g., voice commands or text commands) and process the inputs within the workflow system 400 to produce an output 450 (e.g., dialogue-stream, workflow record, alarms, alerts, etc.). In some embodiments, the workflow system 400 may execute context determination module 420, process the data in an analytical engine 430, and output the results via the communications interface 440. Each of these steps may pull data from a plurality of sources including the workflow database 300.

When inputs 410, 415 are received by the workflow system 400, a context determination using context determination module 420 may first be made. A context determination includes such information as employee profile data (e.g., what employee is associated with the input 410, 415), employee historical performance data (e.g., how has the employee handled tasks associated with the input 410, 415 in the past), task data (e.g., what task is associated with the input 410, 415), preference data of the system, and what request or indication was received as the input 410, 415. These inputs may give context to the workflow system's 400 analysis to determine the output. For example, the context determination module 420 may inform the workflow system 400 as to what action is appropriate.

The workflow system 400 may then analyze the inputs 410, 415 using the analytical engine 430. The analytical engine 430 draws information about the task/employee/product/company etc. from the workflow database 300 and then, in light of the context determination module's 420 determination, computes an appropriate response.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of a local or networked system and/or circuitry 200. Data may be received, generated, and/or maintained on an ongoing basis to provided continuously updated calculations for analyzing the workers' efficiency. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, personal computers, servers, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program goods. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 210, workflow database 300, and/or workflow system 400 discussed above with reference to FIG. 2, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 220) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein. Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

The operator devices 110A-110N, supervisor device 150, and/or server 160 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, the operator devices 110A-110N, supervisor device 150, and/or server 160 may include one or more output devices, including but not limited to a display, a speaker, a haptic feedback mechanism, a printer, lights, any other mechanism capable of presenting an output to a user, or any combination thereof.

The operator devices 110A-110N, supervisor device 150, and/or server 160 may include components for monitoring and/or collecting information regarding the user or external environment in which the component is placed. For instance, the operator devices 110A-110N, supervisor device 150, and/or server 160 may include sensors, scanners, and/or other monitoring components. In some embodiments, scanners may be used to determine the presence of certain individuals or items. For example, in some embodiments, the components may include a scanner, such as an optical scanner, RFID scanner, and/or other scanner configured to read human and/or machine readable indicia physically associated with an item.

Figure 5:
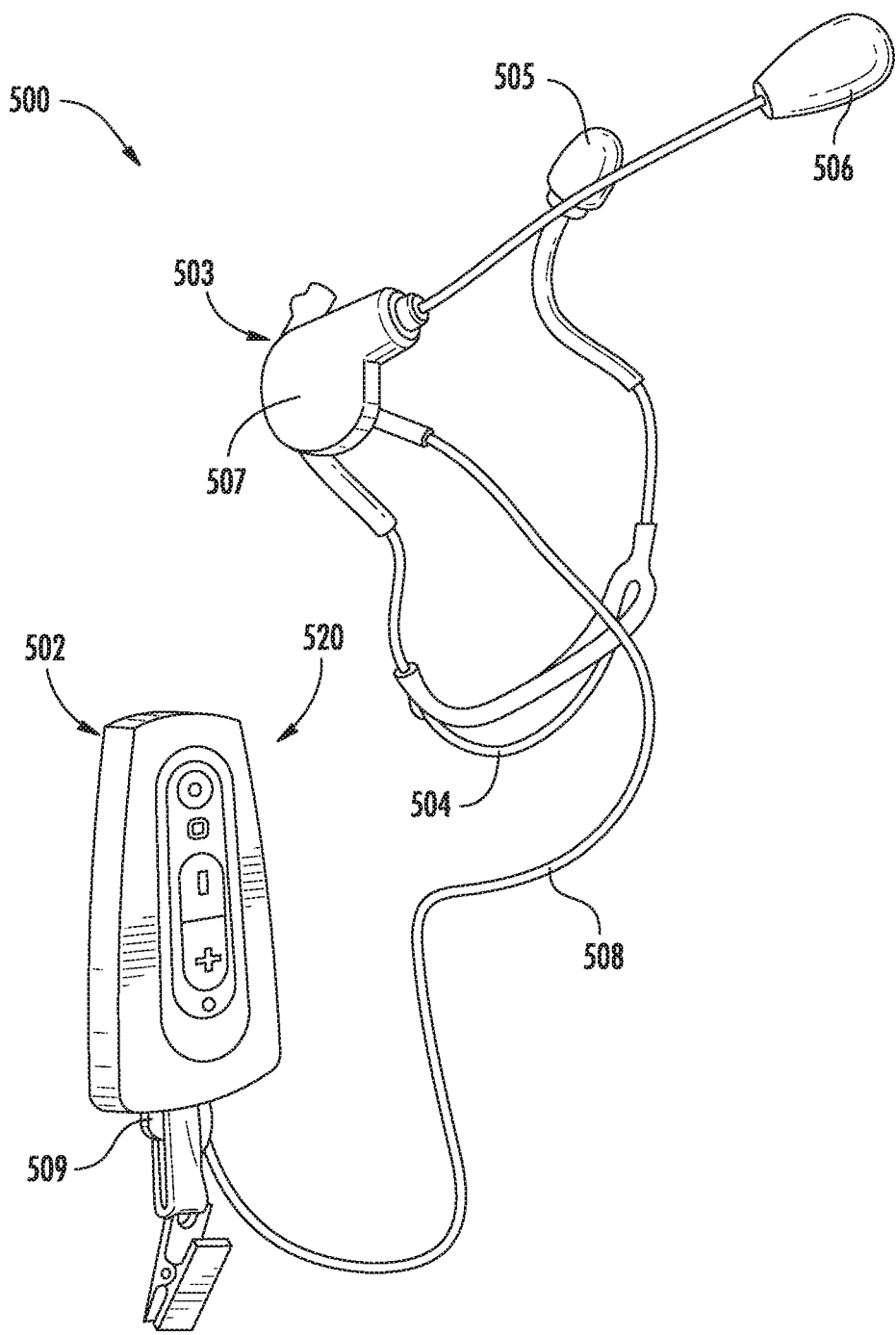
FIG. 5 illustrates an exemplary user device according to an example embodiment.

FIG. 5 illustrates an exemplary user device (e.g., operator devices 110A-110N, supervisor device 150, and/or server 160) according to an example embodiment. In the embodiment illustrated in FIG. 5, the user device 500 is a headset that includes a wireless enabled voice recognition device that utilizes a hands-free profile.

In one embodiment, the headset may be substantially similar to the headset disclosed in U.S. Provisional Patent Application No. 62/097,480 filed Dec. 29, 2014, U.S. Provisional Patent Application No. 62/101,568, filed Jan. 9, 2015, and U.S. patent application Ser. No. 14/918,969, and the disclosures therein are hereby incorporated by reference in their entireties.

In the embodiment illustrated in FIG. 5, the user device 500 includes an electronic module 502. In this embodiment, elements are incorporated into an electronics module 502 rather than the headset 503, to provide a long battery life consistent with long work shifts. One or more components of circuitry 200 may be incorporated in the electronic module 502 and/or the headset 503. The electronics module 502 is remotely coupled to a light-weight and comfortable headset 503 secured to a worker head via a headband 504. The headband 504 can be a band that is designed to fit on a worker's head, in an ear, over an ear, or otherwise designed to support the headset. The headset 503 includes one or more speakers 505 and includes one or more microphones. For instance, in the embodiment illustrated in FIG. 5, the headset 503 includes microphones 506, 507. Microphone 507 can provide for noise cancellation by continuously listening to and blocking environmental sounds to enhance voice recognition and optionally provide for noise cancellation. In some embodiments (not shown), the electronics module 502 can be integrated into the headset 503 rather than being remotely coupled to the headset 503. Various configurations may be used without deviating from the intent of the present disclosure.

In some embodiments, the electronics module 502 can be used to offload several components of the headset 503 to reduce the weight of the headset 503. In some embodiments, one or more of a rechargeable or long life battery, display, keypad, Bluetooth® antenna, and printed circuit board assembly (PCBA) electronics can be included in the electronics module 502 and/or otherwise incorporated into the user device 500.

In the embodiment illustrated in FIG. 5, the headset 503 attaches to the electronics module 502 via a communication link such as a small audio cable 508, but could instead communicate with the electronics module 502 via a wireless link. In some embodiments, the headset 503 has a low profile. For instance, headset 503 can be minimalistic in appearance in some embodiments, such as a Bluetooth earpiece/headphone.

Electronics module 502 can be used with various headsets 503, such as VOCOLLECT™ headsets. The electronics module 502 can read a unique identifier (I.D.) of the headset 503, which can be stored in the circuitry of the user device 500 (e.g., the circuitry 200) and is also used to electronically couple the speakers and microphones to electronics module 502. In one embodiment, the audio cable 508 includes multiple conductors or communication lines for signals which can include a speaker +, speaker −, ground digital, microphone, secondary microphone, and microphone ground. The electronics module 502 can utilize a user configurable attachment 509, such as a plastic loop, to attach to a user. For instance, in the embodiment illustrated in FIG. 5, the electronics module 502 can be mounted to a worker torso via a lapel clip and/or lanyard.

In some embodiments, the headset 503 can include a small lightweight battery, such as when a wireless link between the headset 503 and electronics module 502 is used, such as Bluetooth type of communication link. The communication link can provide wireless signals suitable for exchanging voice communications.

In some embodiments, voice templates can be stored locally in the electronic module 502 and/or the headset 503 as part of the circuitry 200 to recognize a user's voice interactions and may convert the interaction into text based data and commands for interaction with an application running in the circuitry 200. For example, the user device 500 can perform voice recognition in one embodiment utilizing the voice templates. Further, in one embodiment, the first stages of voice recognition can be performed in the user device 500, with further stages performed on a server 160. In further embodiments, raw audio can be transmitted from user device 500 to the server 160 where the final stages of voice recognition are completed.

Figure 6:
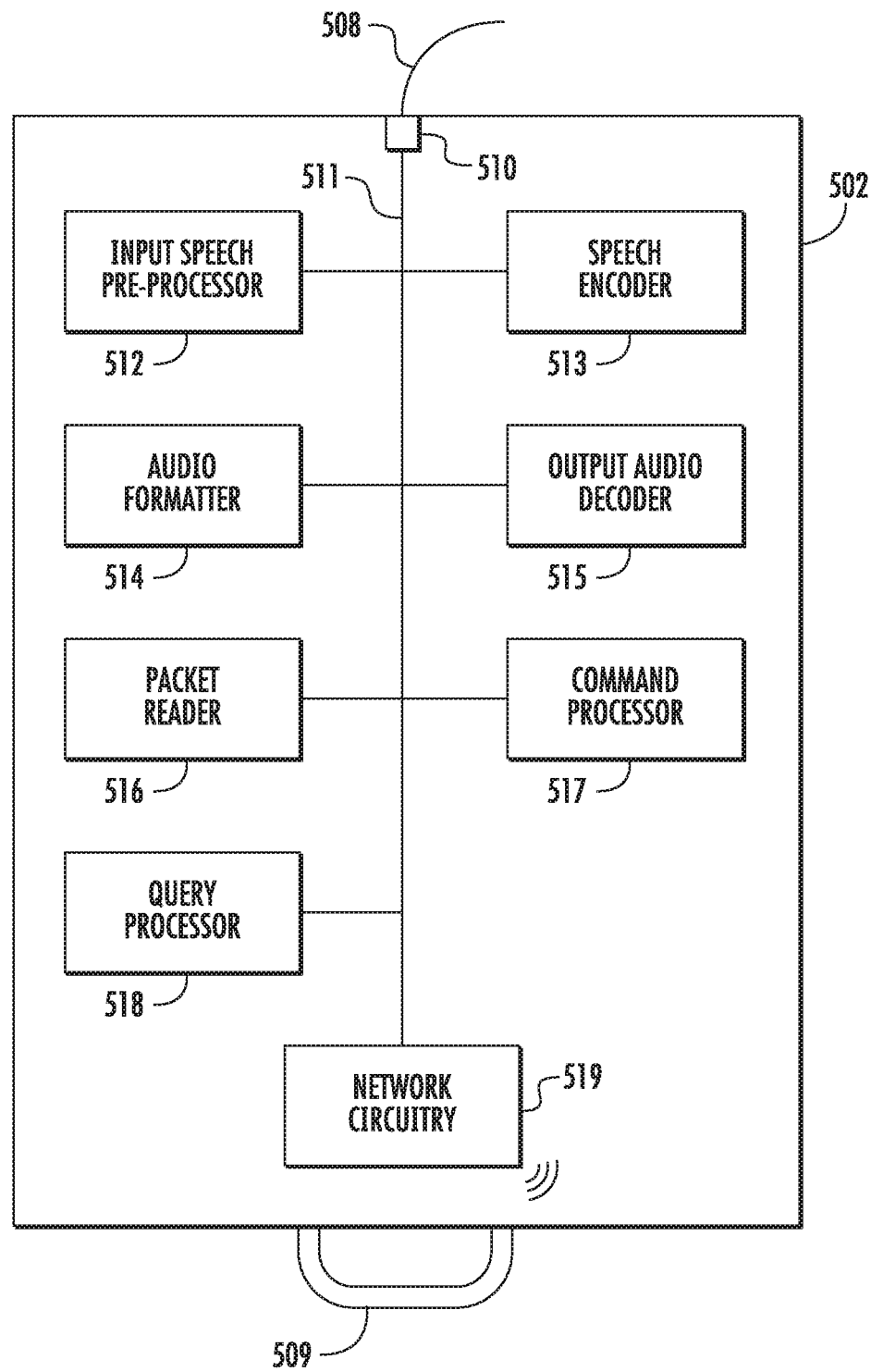
FIG. 6 illustrates a block diagram of an exemplary user device according to an example embodiment.

FIG. 6 illustrates an exemplary block diagram of an electronics module 502 in accordance with some embodiments of the present disclosure. The components illustrated in FIG. 6 may be in addition to one or more components of the circuitry 200 shown in FIG. 2, which may be part of the electronics module 502. In some embodiments, one or more of the components illustrated in FIG. 6 may be included in the electronics module 502 and/or other parts of the user device 500, operator devices 110A-110N, supervisor device 150, and/or server 160.

In the embodiment shown in FIG. 6, the electronics module 502 includes an enclosure, such as a plastic case, with a connector 510 that mates with a complimentary mating connector (not shown) on audio cable 508. An internal path 511 is used to communicate between multiple components within the electronics module 502 enclosure. In one embodiment, an input speech pre-processor (ISPP) 512 converts input speech into pre-processed speech feature data. An input speech encoder (ISENC) 513 encodes input speech for transmission to one or more other parts of circuitry 200 for reconstruction and playback and/or recording. A raw input audio sample packet formatter 514 transmits the raw input audio to one or more other parts of circuitry 200 using an application-layer protocol to facilitate communications between the voice terminal and headset 503 as the transport mechanism. For the purposes of the transport mechanism, the formatter 514 can be abstracted to a codec type referred to as Input Audio Sample Data (IASD). An output audio decoder (OADEC) 515 decodes encoded output speech and audio for playback in the headset 503. A raw output audio sample packet reader 516 operates to receive raw audio packets from one or more other parts of circuitry 200 using the transport mechanism. For the purposes of the transport mechanism, this formatter 514 can be abstracted to a codec type referred to as Output Audio Sample Data (OASD). A command processor 517 adjusts the headset 502 hardware (e.g., input hardware gain level) under control of one or more other parts of circuitry 200. A query processor 518 allows one or more other parts of circuitry 200 to retrieve information regarding headset operational status and configuration. Path 511 is also coupled to network circuitry 519 to communicate via wired or wireless protocol with one or more other parts of circuitry 200. The ISPP 512, ISENC 513, and raw input audio formatter 514 are sources of communication packets used in the transport mechanism; the OADEC 515 and raw output audio reader 516 are packet sinks. The command and query processors 517, 518 are both packet sinks as well as sources (in general they generate acknowledgement or response packets).

Figure 7:
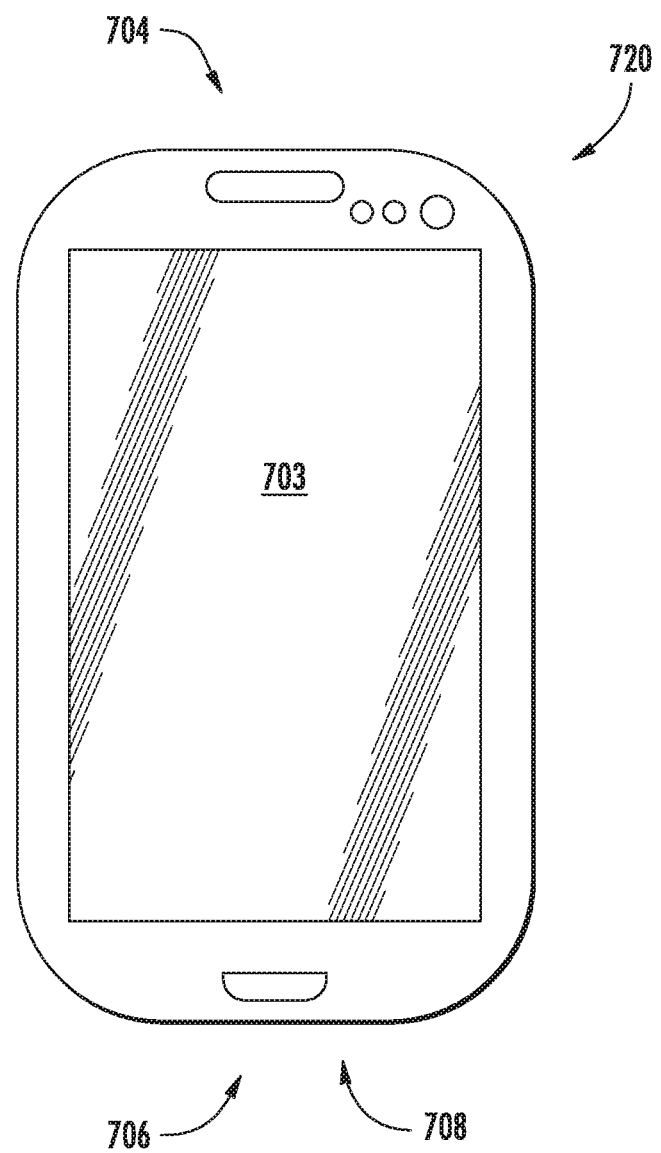
FIG. 7 illustrates an exemplary user device according to an example embodiment.
Figure 8:
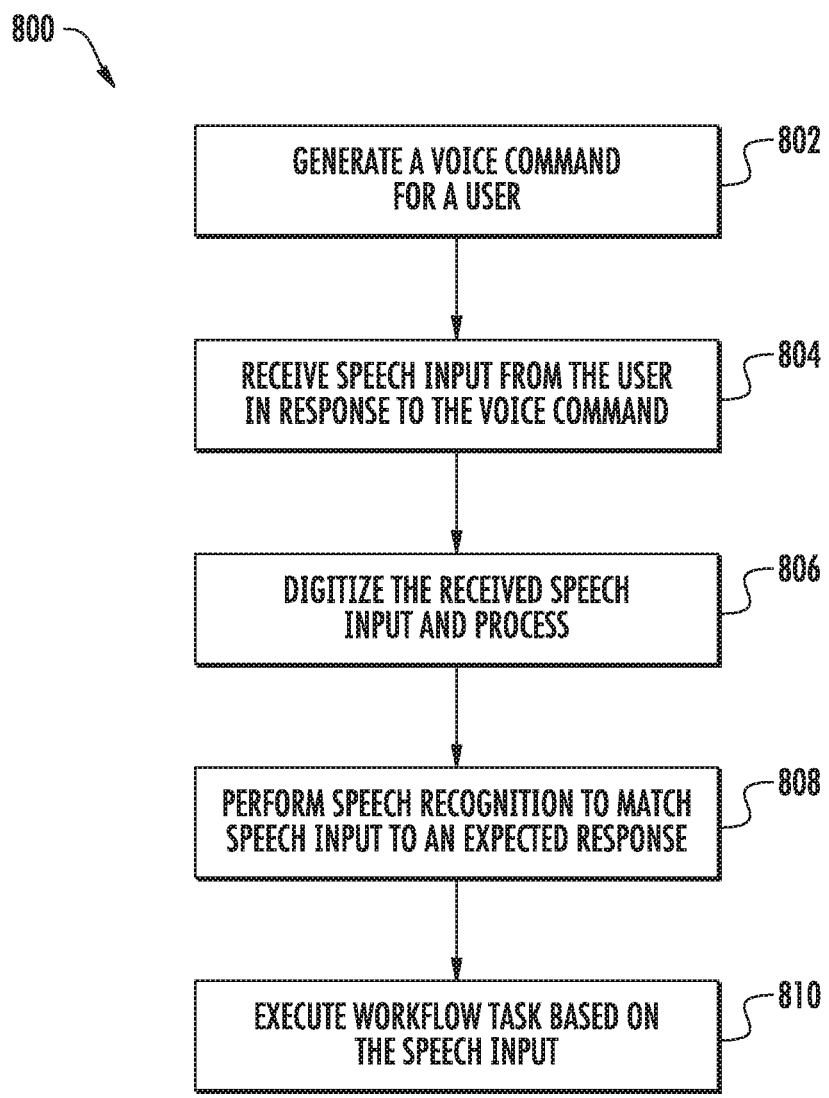
FIG. 8 is a flowchart illustrating a method for providing speech dialogue between a user and a device, according to an example embodiment.

FIG. 7 illustrates an exemplary user device (e.g., operator devices 110A-110N, supervisor device 150, and/or server 160) according to an example embodiment. In the embodiment illustrated in FIG. 7, the user device is a handset 704 (e.g., a mobile device or tablet device). The handset 704 may include one or more components of circuitry 200 as explained with regards to FIG. 1 and may include one or more of the components discussed with regards to the headset of FIGS. 5 and 6 (e.g., voice templates, speech encoders, etc.). The handset 704 may include one or more microphones 706 and one or more speakers 708, which may be connected to a set of headphones. The handset 704 can also include one or more antenna. The microphone 706 receives speech or sound and transmits the received speech and sound to one or more components of circuitry 200 in the handset 704. The speakers 708 receive an audio transmission from one or more components of circuitry 200 in the handset 704 and output the audio transmission in the form of speech or sound. In an embodiment, the speakers 708 can also include noise cancellation. The handset 704 may connect with one or more other operator devices 110A-110N, supervisor device 150, and/or server 160 as explained with regards to FIG. 1. For instance, in some embodiments, the handset 204 may connect to a wireless headphone via a Bluetooth connection, where the wireless headphone includes a microphone and speaker for receiving speech and outputting speech or sound. The handset 204 can also include a user input device and output device (such as the display 203 forming an interface) to send and receive additional non-auditory information from circuitry 200, whether incorporated into the handset 704 or in other operator devices 110A-110N, supervisor device 150, and/or server 160. The display 203 of FIG. 7 may be a backlit LCD or OLED display. With the use of a handset 704 having one or more microphones 706 and one or more speakers 708, a user can communicate with a central server (e.g., server 160) and/or with other user devices (e.g., operator devices 110A-110N, supervisor device 150, and/or server 160).

Although FIG. 7 illustrates one example of a handheld device, various changes may be made to FIG. 7. For example, all or portions of FIG. 7 may represent or be included in other handheld devices and may be used in conjunction with a headset such as the headset of FIG. 5. Also, the functional division shown in FIG. 7 is for illustration only. Various components could be combined, sub- divided, or omitted and additional components could be added according to particular needs.

One suitable device for implementing the present disclosure may be the TALKMAN® product available from VOCOLLECT™ of Pittsburgh, Pa. In accordance with one aspect of the present disclosure, the user device (e.g., operator devices 110A-110N, supervisor device 150, and/or server 160) may be used in a voice-driven system, which may use speech recognition technology for communication. In an embodiment, the user device may provide hands-free voice communication between the user and the device. To that end, digital information may be converted to an audio format, and vice versa, to provide speech communication between the user device or an associated system and the user. In an example embodiment, the user device may receive digital instructions from a central computer and/or a server and may convert those instructions to audio to be heard by the user. The user may then reply, in a spoken language, and the audio reply or the speech input may be converted to a useable digital format to be transferred back to the central computer and/or the server. In other embodiments, the user device may operate independently, in an offline mode, such that speech digitization, recognition and/or synthesis for implementing a voice-driven workflow solution may be performed by the user device itself.

FIG. 8 illustrates an exemplary embodiment of a method 800 for providing voice based communication and/or speech dialogue between a user and a user device in a workflow environment. The method 800 may include generating a voice command for a user 802. In an embodiment, the user device may include output devices, such as, speakers for receiving digital instructions and/or commands from one or more components of the electronics module 502 in the user device and output the audio transmission in the form of speech or sound. In an embodiment, the circuitry 200 may include a dialogue engine in operative communication with one or more components of the circuitry 200. For instance, the dialogue engine may be stored in the memory. For a given workflow task, the user device may be required to carry on a dialogue with the user, which may include a series of messages or instructions or questions to output to the user. Such elements of the dialogue may be referred to as "prompts". In accordance with one aspect of the present disclosure, the prompts may be output in the form of voice commands generated by the dialogue engine and/or the speakers. For example, a prompt asking a user for a quantity of goods may designate that an audible prompt or a voice command be provided by the speaker to the user, in accordance with the invention. Additionally, the voice command may also include information indicating which input modes or components are appropriate to capture or receive any incoming data for answering or addressing the prompt and/or the voice command.

As described above, the dialogue engine may be instructed by one or more components of the circuitry 200 as to which modes or components to use for any given prompt. Thus, the dialogue engine may control the execution of the workflow task by managing the output components and the input components of the user device in conjunction with the workflow system 400. For example, the dialogue engine may provide an output prompt by causing a voice synthesizer with a text-to-speech (TTS) functionality to produce an appropriate voice command played by the speaker.

The method 800 may further include receiving a speech input from a user in response to the voice command 804. In accordance with one aspect of the present disclosure, the workflow task being executed may include a series of instances or junctures where an input is expected to be received in response to the voice command from the user. For example, a voice command asking a user for a quantity of goods may require a user to provide an input, such as, a voice command (e.g., speech input), providing quantity information, in accordance with the invention. In an example embodiment, the user device, as described above, may further include input devices, such as a microphone for receiving speech inputs from a user. The microphone may further transmit the received speech input to one or more components of circuitry 200 for further processing and recognition.

The method 800 may include digitizing the received speech input and processing digitized speech 806. In accordance with one aspect of the present disclosure, a microphone or other electro-acoustical components of the user device may receive a speech input from a user and may convert the speech input into an analog voltage signal. The analog voltage signal may then be forwarded to one or more components of the circuitry 200, such as, but not limited to, analog to digital convertors, audio processing circuits such as audio filters, correlation electronics module, and the like. Specifically, the circuitry 200 may include suitable digitization electronics module (e.g., in electronics module 502) for providing appropriate representations of the speech input received from the user for further processing. In an embodiment, the digitization electronics module may include an audio coder/decoder chip or CODEC. Further, the digitization electronics module may include necessary filters, equalization electronics module and/or software for converting the analog speech input into a digitized stream of data that can be separated into separate units for analysis.

Further, in accordance with one aspect of the present invention, the circuitry 200 may further include audio and/or speech analysis electronics module and signal processing electronics module for analyzing and further processing the digitized speech inputs. For example, the user device may include spectral transformation electronics module, or audio filtering electronics module, such as Mel scale filters, which may create a spectral transform of the digitized audio signals and may provide a series of sampled representations or values associated with the digitized audio signals. In an example embodiment, the circuitry 200 may divide the digital stream of data that may be created into a sequence of time-slices, or frames, each of which may then be processed by a feature generator, thereby producing features (vector, matrix, or otherwise organized set of numbers representing the acoustic features of the frames). The features may then be used by speech recognition components of the circuitry 200 for further processing.

The method 800 may further include performing speech recognition to match speech input to an expected response 808. In accordance with one aspect of the present disclosure, a speech recognition search algorithm function, realized by an appropriate circuit and/or software in the user device may analyze the features, as described above, to determine what hypothesis to assign to the speech input captured by the microphone of the device. As is known in the art, in one recognition algorithm, the recognition search relies on probabilistic models provided through a database of suitable models to recognize the speech input. Each of the models in the database may either be customized to a user or be generic to a set of users.

One common modeling technique utilized for speech recognition includes Hidden Markov Models (HMM). In speech recognition, these models may use sequences of states to describe vocabulary items, which may be words, phrases, or subword units. As used herein, the term "word" may refer to a vocabulary item, and thus may mean a word, a segment or part of a word, or a compound word, such as "next slot" or "say again." Therefore, the term "word" may not be limited to just a single word. Each state in an HMM may represent one or more acoustic events and may serve to assign a probability to each observed feature vector. Accordingly, a path through the HMM states may produce a probabilistic indication of a series of acoustic feature vectors. The model may be searched such that different, competing hypotheses (or paths) are scored; a process known as acoustic matching or acoustic searching. A state S may be reached at a time T via a number of different paths. For each path reaching a particular state at a particular time, a path probability may be calculated. Using the Viterbi algorithm, each path through the HMM may be assigned a probability. In particular, the best path may be assigned a probability. Furthermore, each word in the best path may be assigned a probability. Each of these probabilities may be used as a confidence factor or combined with other measurements, estimates or numbers to derive a confidence factor. The path with the highest confidence factor, the best hypothesis, can then be further analyzed.

When in operation, the search algorithm (which can be implemented using Hidden Markov Models with a Viterbi algorithm or other modeling techniques such as template matching dynamic time warping (DTW) or neural networks), in essence, may compare the features generated, as described above, with reference representations of speech, or speech models, in a database in order to determine the word or words that best match the speech input. In an embodiment, part of this recognition process may be to assign a confidence factor for the speech to indicate how closely the sequence of features from the search algorithm matches the closest or best-matching models in the database. As such, a hypothesis consisting of one or more vocabulary items and associated confidence factors may be directed to an acceptance algorithm to determine expected response. In accordance with the above embodiment, if the confidence factor is above a predetermined acceptance threshold, then the acceptance algorithm may decide to accept the hypothesis as recognized speech. If, however, the confidence factor is not above the acceptance threshold, as utilized by the acceptance algorithm, then the acceptance algorithm may decide to ignore or reject the recognized speech. The user device may then prompt the user to repeat the speech input. In this instance, the user may repeat the speech input provided to the microphone.

The method 800 may further include executing the workflow task based on the speech input 810. In some embodiments, a user may be executing a task in a workflow solution, thereby receiving and providing speech inputs to the microphone of the user device. The speech inputs received from a user may relate to a voice command and/or query related to the task in the workflow solution. For example, the user device may provide a voice command to the user to move to a pick-up location corresponding to an item to be picked up in a warehouse and/or a distribution facility. Once the user arrives at the pick-up location and picks the article, the user may be required to provide a speech input indicating a pick-up confirmation to the user device to move further in the workflow. In some embodiments, a user may provide a speech input indicating an identification number, or the like, of an item picked-up by the user, aisle and/or shelf number confirming a pick-up location, and the like. Thus, when the digitized and processed speech input matches the expected response, the workflow task is executed by the circuitry 200 and/or associated processor based on the speech input.

Figure 9:
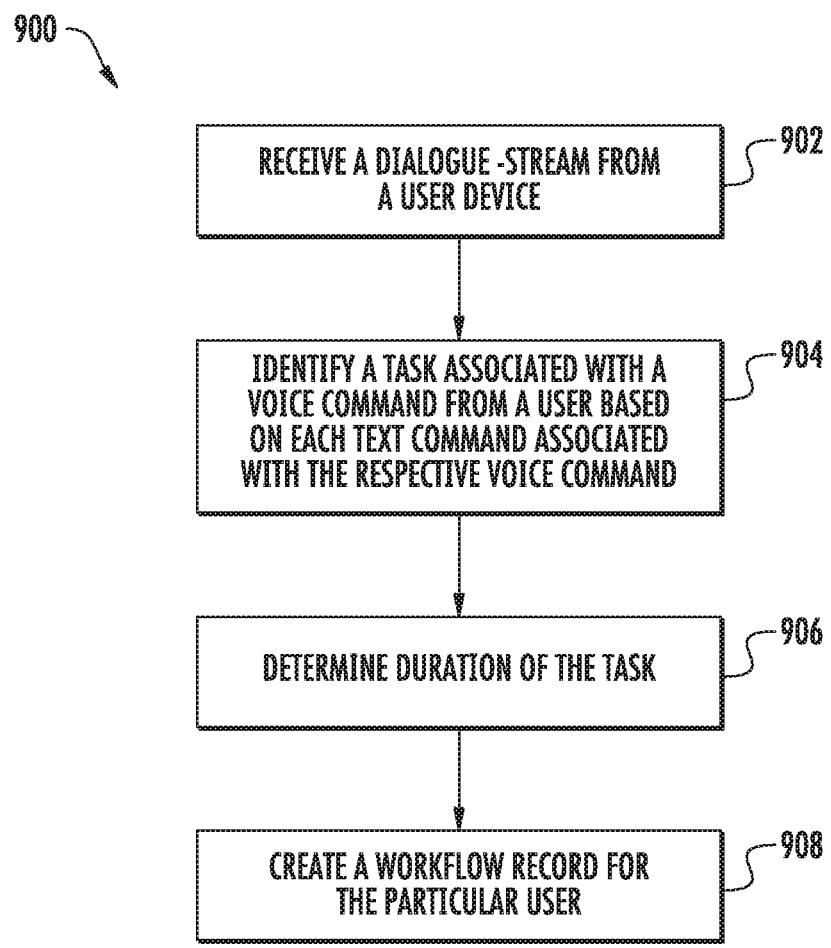
FIG. 9 is a flowchart illustrating a method for identifying inefficient workers in a workplace, according to an example embodiment.

FIG. 9 illustrates an exemplary embodiment of a method 900 for identifying inefficient workers in a workplace. The operations illustrated in FIG. 9 may, for example, be performed by, with the assistance of, and/or under the control of the server 160, such as through the use of circuitry 200. Alternatively, the operations illustrated in FIG. 10 may, for example, be performed by, with the assistance of, and/or under the control of an operator device 110 and/or supervisor device, such as through the use of circuitry 200. Various aspects of the method 900 may be performed by one or more of the operator device 110, supervisor device 150, and/or server 160.

with a voice command from a user based on each text command associated with the respective voice command 904 and determining a duration of the task 906. In accordance with one aspect of the present disclosure, the user device 110, supervisor device 150, server 160, and/or any other associated device may create a workflow record for a particular user based on identifying a task associated with a voice command from a user based on each text command associated with the respective voice command and determining a duration of the task. For example, the workflow record may include information, such as, User A/Task—Picking Complete/Duration—4 minutes, User B/Task—Picking Complete/Duration—10 minutes, etc. The workflow record may be used to monitor the efficiency of each worker. An exemplary workflow record is shown below:

| timestamp | | | Event Generated | event start timestamp | event duration in seconds | comment |
|---|---|---|---|---|---|---|
| 1501605714 | ==> | Welcome to the s9873216 system. Say ready | | | | login begins |
| 1501605720 | <== | ready | | | | |
| 1501605726 | ==> | Password? | | | | |
| 1501605725 | <== | * | | | | |
| 1501605728 | <== | * | | | | |
| 1501605733 | <== | * | | | | |
| 1501605734 | | | LogInComplete | 1501605714 | 21 | |
| 1501605736 | ==> | Region? | | | | |
| 1501605737 | <== | 1 | | | | |
| 1501605739 | ==> | stockless, correct? | | | | |
| 1501605742 | <== | yes | SelectRegionComplete | 1501605736 | 6 | |
| 1501605744 | ==> | To receive work, say ready | | | | |
| 1501605749 | <== | ready | | | | |

==> means device speaks
<== means operator speaks

In accordance with an aspect of the present disclosure, the method 900 may include receiving a dialogue-stream from a user device 902. As described above, a dialogue-stream may include text commands and a time associated with each text command. Further, the text commands may be formed by transforming audio signals associated with voice commands received from a user to one or more points in data that are stored in a database. The database may be stored in a memory of the operator device 110, supervisor device 150, server 160, and/or may be remotely stored and may be accessible to the above-mentioned devices. The database may include a list of voice templates and/or keywords and their corresponding data points in text. Thus, the dialogue-stream may include timestamp of receipt of each voice command and text commands for each voice command. The text commands and time of receipt of each voice command associated with the respective text command may be gathered into a single collection organized by the time of receipt.

In some embodiments, the user device 110, supervisor device 150, server 160, and/or any other associated device may further recognize tags in the dialogue-stream. The tags may indicate that an associated text command in the dialogue-stream originated from a user as opposed to the user device (and is thus "user-initiated"). Further, the user device 110, supervisor device 150, server 160, and/or any other associated device may further remove items in the dialogue-stream that are not associated with the tags to create a user-initiated dialogue-stream. The user-initiated dialogue-stream dialogue stream may be analyzed further for monitoring efficiency of a worker.

The method 900 may further include creating a workflow record for the particular user by identifying a task associated In accordance with one aspect of the present disclosure, identifying a task associated with a voice command may include determining a current state of the user device, determining a next state of the user device, identifying a trigger to move to the next state of the user device, and adding the task to the workflow record after identifying the trigger. In some embodiments, the current state may be determined by the earliest received voice command and associated text command or a voice command received from the user device that has not been associated with any task. The current state may relate to the software model of the user device as well as the actual state of the device (on, off, sleeping, charging, on-air. The next state may be determined by identifying a task intended to follow the current state from the database or another database. Further, the trigger may include a dialogue of interest related to the next state and may be provided in any input form such as a voice command or button command. The dialogue of interest may be matched to specific patterns and that match is the trigger. The specific patterns may be respective to the particular action/task being performed (e.g., "yes" may only change the state of the user device when the user is engaged in responding to the device's request for confirmation). A workflow record may be formed of multiple individual tasks, each having a start, a trigger, and an end. Each task may have further sub-tasks. For example, a workflow record for a picking operation, may include tasks such as user login, receiving pick list, routing, providing first pick location to worker, confirming pick operation, providing next pick location to user, etc. Furthermore, a task, such as user login, may have one or more sub-tasks, such as receiving username and/or user ID from worker, receiving password from worker, authenticating, and the like. A task may have multiple pick and travel actions. A new task or particular other defined task may end the current task when it starts. Each task may have an associated trigger to end a current task and move the workflow record to the adjacent task. In some embodiments, a task may be ended when a new task begins, or it may continue if it is determined by the logic that the new task may be part of the previous task. The original task duration may or may not continue to accrue, depending on the nature of the new task (e.g. acquiring a new pallet while performing a pick should not cause the duration of the pick to accrue, but the time spent before and after the pallet acquisition may).

In some embodiments, button commands may be manually inputted by the worker in the workplace. The processor may incorporate the button commands into the text commands by identifying one or more points in data stored in the database or another database related to each of the button commands. The processor may further incorporate the text commands from the button commands into the dialogue-stream.

The method 900 may further include determining a duration of the task 906. In accordance with one aspect of the present disclosure, the user device 110, supervisor device 150, server 160, and/or any other associated device may determine the duration of a task may include identifying a text command or a voice command received from the user device in the dialogue-stream associated with a start of the task in the database or another database, identify a text command or a voice command received from the user device in the dialogue-stream associated with an end of the task in the database or another database, and determine a time between the start of the task and the end of the task. In some embodiments, the method may further include determining an average duration of tasks associated with the voice commands by averaging the duration of each task over a statistically significant number of repetitions of the task.

In some embodiments, the user device 110, supervisor device 150, server 160, and/or any other associated device may further determine a rate of interaction of a user by calculating a number of text commands over a period of time in the user-initiated dialogue-stream. In some embodiments, the method 900 may further include creating an alarm associated with the task. The alarm may notify a supervisor device that the particular user has exceeded a maximum duration of the task by transmitting an indication to the supervisor device 150 when the duration of the task exceeds the maximum duration of the task in the workflow record. For example, if the maximum duration set for the picking operation, as described above, is 7 minutes, an alarm and/or an indication may be sent to the supervisor device 150 when User B exceeds the 7-minute time duration. In further embodiments, the workflow record and/or the dialogue-stream may be used to identify periods of non-activity of the worker with the device.

In some embodiments, the method 900 may further include receiving dialogue-streams from multiple user devices. Each dialogue-stream may include text commands and a time associated with each text command. The text commands may be formed by transforming voice commands into the text commands by converting audio signals associated with the voice commands to one or more points in data that are stored in the database or another database. The method may further include creating workflow records for the users by identifying a task for a voice command in each workflow record and determining a duration of each task of each workflow record, and comparing the duration of each task of each workflow record. In some embodiments, the method 900 may further include filtering the workflow records for a single task, and determining an average duration of the single task over the workflow records, a minimum duration of the single task over the workflow records, a maximum duration of the single task over the workflow records, and other statistical information, such as standard deviation, correlation, etc. Other calculations may be determined and used herein. In some embodiments, the method 900 may further include creating an alarm associated with the single task. The alarm may notify a supervisor device that a user has exceeded a set duration of the single task by transmitting an indication to the supervisor device when the duration of the single task exceeds the set duration in the workflow record of the user. In some embodiments, the alarm may be transmitted to the user device. In some embodiments, the method 900 may further include identifying a period of non-activity of a user by identifying a period of time where the rate of interaction decreases to a defined value and causing an indication to be transmitted to a supervisor device notifying a supervisor of the particular user of the occurrence of the period of non-activity.

Figure 10:
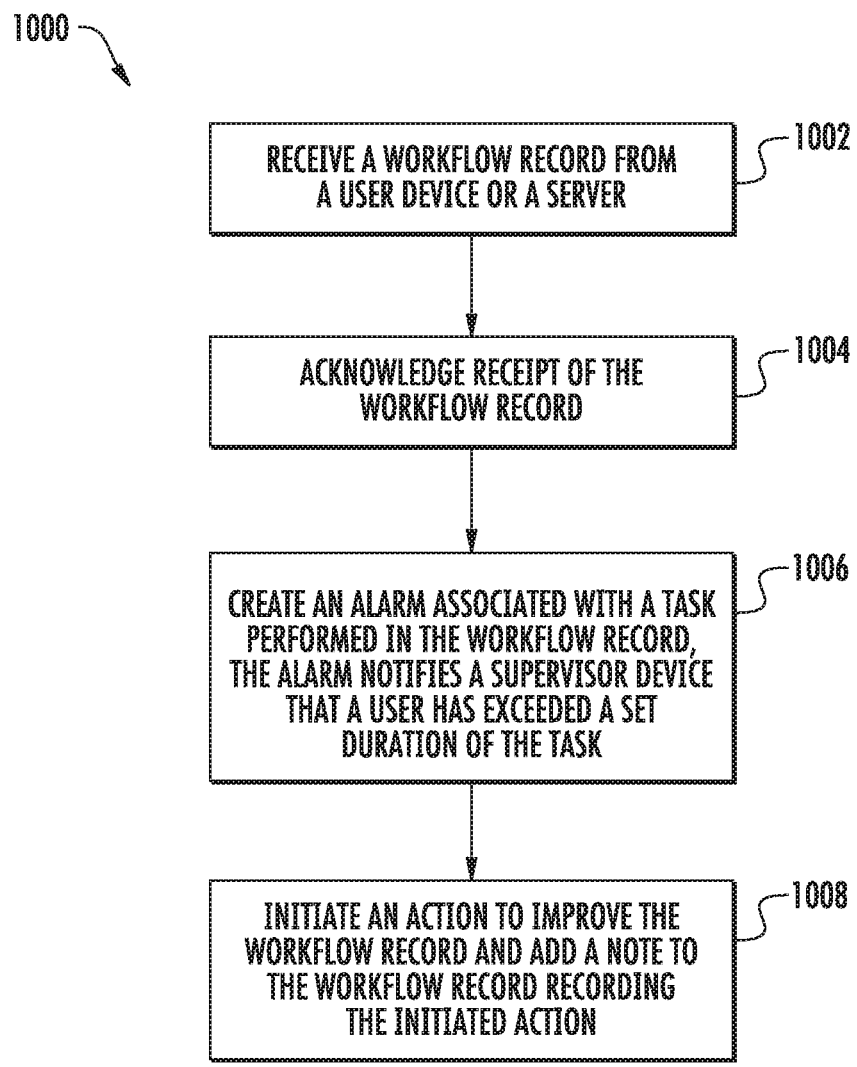
FIG. 10 is a flowchart illustrating a method for identifying inefficient workers in a workplace, according to an alternate example embodiment.

FIG. 10 illustrates an exemplary embodiment of a method 1000 for identifying inefficient workers in a workplace. The operations illustrated in FIG. 10 may, for example, be performed by, with the assistance of, and/or under the control of the supervisor device 150, such as through the use of circuitry 200. Alternatively, the operations illustrated in FIG. 10 may, for example, be performed by, with the assistance of, and/or under the control of operator device 100 and/or server 160. Various aspects of the method 1000 may be performed by one or more of the operator device 110, supervisor device 150, and/or server 160.

In accordance with an aspect of the present disclosure, the method 1000 may include receiving a workflow record from a user device 110 or a server 160 1002. As described above, the supervisor device 150 may receive a workflow record for monitoring productivity and/or efficiency of a worker. The workflow record may be created by the user device 110, server 160, or any other associated device based on identifying a task associated with a voice command from a user based on each text command associated with the respective voice command and determining a duration of the task. Further, the workflow record may be used to generate an efficiency metric. For example, the workflow record may include information for the supervisor to determine a rate of interaction of a user by calculating a number of text commands over a period of time in the user-initiated dialogue-stream, a maximum duration of the task by a user, etc. In further embodiments, the workflow record and/or the dialogue-stream may be used to identify periods of non-activity of the worker with the device by the supervisor. Further, as described above, dialogue-stream may include text commands and a time associated with each text command. The text commands may be created by transforming audio signals associated with voice commands received from a user to one or more points in data that are stored in a database. The database may be stored in a memory of the device 110, supervisor device 150, server 160, and/or may be remotely stored and may be accessible to the above-mentioned devices. The database may include a list of voice templates and/or keywords and their corresponding data points in text. Thus, the dialogue-stream may include timestamp of receipt of each voice command and text commands for each voice command. The dialogue-stream may gather the text commands and time of receipt of each voice command associated with the respective text command into a single collection organized by the time of receipt.

The method 1000 may further include acknowledging receipt of the workflow record 1004. In accordance with one aspect of the present disclosure, the supervisor device 150 may transmit an indication to the user device 110 or server 160 from which the workflow record was received. In an embodiment, the indication may indicate that the workflow record was received at the supervisor device 150.

The method 1000 may further include creating an alarm associated with a task performed in the workflow record 1006. In an embodiment, the alarm may notify the supervisor device 150 that a user has exceeded a set duration of the task. In some embodiments, the set duration may be determined by the user device 110, supervisor device 150, and/or the server 160 by calculating an average duration of the task as performed by users. In some embodiments, the user device 110, supervisor device 150, and/or the server 160 may determine the average duration of tasks associated with the voice commands by averaging the duration of each task over a statistically significant number of repetitions of the task.

Further, the method 1000 may include initiating an action to improve the workflow record 1008. In accordance with one aspect of the present disclosure, the supervisor device 150 may further include adding a note to the workflow record recording the initiated action. In some embodiments, the note can be time stamped and may be included in a summary of the worker's record. The note may allow a supervisor and/or the worker to observe the effect of the action taken. For example, if a worker in an assembly area may be lagging in assembling the products, as reflected by the workflow record of the user, the supervisor and/or the supervisor device 150 may initiate an appropriate action to improve the workflow record. By way of an example, the initiated action may be to enroll the worker in the next available training slot for assembling the said product. The supervisor and/or the supervisor device 150 may further add a note to the workflow record of the worker stating "Retraining Initiated." In some embodiments, the user device 110, supervisor device 150, the server 160, and/or any other associated device may initiate an action to improve the workflow record by notifying a user that the user is inefficient by transmitting an indication to the user device. In some embodiments, the action to improve the workflow record may include requesting additional materials, workers, or a combination thereof to perform the task. In this regard, the user device 110, supervisor device 150, the server 160, and/or any other associated device may transmit an indication to a server indicating that additional materials, workers, etc. are needed to perform the task. Thus, based on the method 1000, as described above, inefficient workers may be readily identified and appropriate action may be taken to ensure that worker productivity and efficiency is improved.

FIGS. 8-10 illustrate example flowcharts of the operations performed by an apparatus, such as user device of FIG. 1 and/or server of FIG. 1, in accordance with example embodiments of the present invention. It will be understood that each block of the flowcharts, and combinations of blocks in the flowcharts, may be implemented by various means, such as hardware, firmware, one or more processors, electronic module 502 and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 8-10 when executed, convert a computer or processing electronic module 502 into a particular machine configured to perform an example embodiment of the present invention. Accordingly, the operations of FIGS. 8-10 define an algorithm for configuring a computer or processor, to perform an example embodiment. In some cases, a general purpose computer may be provided with an instance of the processor which performs the algorithm of FIGS. 8-10 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by electronic module 502 that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module (or processor-executable instructions) which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

In addition, the section headings used herein are provided for consistency with the suggestions under 37 C.F.R. 1.77 or to otherwise provide organizational cues. These headings shall not limit or characterize the invention(s) set out in any claims that may issue from this disclosure. For instance, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. For example, the various elements or components may be combined or integrated in another system or certain features may be omitted or not implemented. Moreover, the steps in the method described above may not necessarily occur in the order depicted in the accompanying diagrams, and in some cases one or more of the steps depicted may occur substantially simultaneously, or additional steps may be involved.

Although specific terms are employed herein, they are used in a generic and descriptive sense only and not for purposes of limitation.

We claim:

1. A voice controlled apparatus that is configured to identify inactive workers in a workplace, the apparatus comprising:
a processor, wherein the processor is configured to:
receive a plurality of voice commands from a worker in the workplace;
transform the plurality of voice commands into a plurality of text commands by converting audio signals associated with the plurality of voice commands to one or more points in data that are stored in a database;
create a first dialogue-stream including the plurality of text commands and a time of receipt of each voice command of the plurality of voice commands associated with the respective text command, wherein one or more tags are included in the first dialogue-stream and are associated with the plurality of text commands of the first dialogue-stream, and each of the one or more tags of the first dialogue-stream indicates that an associated text command of the first dialogue-stream originated from the worker as opposed to the voice controlled apparatus;
filter the first dialogue-stream comprising the plurality of text commands to create a second dialogue-stream by recognizing the one or more tags in the first dialogue-stream and removing items in the first dialogue-stream that are not associated with the one or more tags to create the second dialogue-stream, wherein the second dialogue-stream comprises the plurality of text commands corresponding to an event initiated by the worker;
cause the second dialogue-stream to be transmitted to a server,
wherein a workflow record is created from the second dialogue-stream and is used to:
determine a time duration between adjacent voice commands in the second dialogue-stream associated with at least one task of a plurality of tasks;
determine a rate of interaction of the worker with the voice controlled apparatus based on the time duration between the adjacent voice commands;
determine an average duration of the plurality of tasks associated with the plurality of voice commands by averaging a duration of each task over a statistically significant number of repetitions of the task; and
in response to determining that the rate of interaction is less than a threshold associated with the at least one task and the average duration exceeds a set duration, send a notification to a supervisor device.

2. The apparatus of claim 1, wherein the first dialogue-stream including the plurality of text commands and the time of receipt of each voice command of the plurality of voice commands associated with the respective text command is gathered into a single collection organized by a time of receipt.

3. The apparatus of claim 1, wherein the processor is further configured to receive a plurality of button commands manually inputted by the worker in the workplace, incorporate the plurality of button commands into the plurality of text commands by identifying one or more points in data stored in the database or another database related to each of the plurality of button commands, and incorporate the plurality of text commands from the plurality of button commands into the second dialogue-stream.

4. The apparatus of claim 1, wherein the processor is further configured to provide speech to the worker by converting one or more points in data to one or more audio signals to be converted to speech via a speaker.

5. The apparatus of claim 1, wherein the apparatus further comprises a microphone and a speaker.

6. The apparatus of claim 1, wherein the second dialogue-stream is transmitted to the supervisor device, wherein the supervisor device is controlled by a supervisor of the worker.

7. The apparatus of claim 1, wherein the second dialogue-stream is further used to prepare one or more alarms associated with a maximum duration of a particular task of the workflow record.

8. The apparatus of claim 1, wherein the second dialogue-stream is further used to determine the rate of interaction of the worker with the apparatus.

9. The apparatus of claim 1, wherein the second dialogue-stream is further used to identify periods of non-activity of the worker with the apparatus.

10. A method of identifying inactive workers in a workplace, the method comprising:
receiving a first dialogue-stream from a user device, wherein the first dialogue-stream comprises a plurality of text commands and a time associated with each text command, the plurality of text commands formed by transforming a plurality of voice commands from a particular user into the plurality of text commands by converting audio signals associated with the plurality of voice commands to one or more points in data that are stored in a database, and wherein one or more tags are included in the first dialogue-stream and are associated with the plurality of text commands of the first dialogue-stream, and each of the one or more tags of the first dialogue-stream indicates that an associated text command of the first dialogue-stream originated from the particular user as opposed to the user device;
filtering the first dialogue-stream comprising the plurality of text commands to create a second dialogue-stream by recognizing the one or more tags in the first dialogue-stream and removing items in the first dialogue-stream that are not associated with the one or more tags to create the second dialogue-stream, wherein the second dialogue-stream comprises the plurality of text commands corresponding to an event initiated by the particular user; and
creating a workflow record for the particular user by:
identifying at least one task associated with any one of the plurality of voice commands from the particular user based on each text command associated with the respective voice command,
determine a time duration between adjacent voice commands in the second dialogue-stream associated with at least one task of a plurality of tasks,
determine a rate of interaction of the particular user with the user device based on the time duration between the adjacent voice commands, wherein determining the rate of interaction of the particular user comprises calculating a number of text commands over a period of time in the second dialogue-stream, and
determine an average duration of the plurality of tasks associated with the plurality of voice commands by averaging a duration of each task over a statistically significant number of repetitions of the task; and in response to determining that the rate of interaction is less than a threshold associated with the at least one task and the average duration exceeds a set duration, sending a notification to a supervisor device.

11. The method of claim 10, further comprising gathering the plurality of text commands and a time of receipt of each voice command of the plurality of voice commands associated with the respective text command into a single collection organized by a time of receipt.

12. The method of claim 10, wherein identifying at least one task associated with any one of the plurality of voice commands from the particular user based on each text command associated with the respective voice command comprises:
   determining a current state of the user device;
   determining a next state of the user device;
   identifying a trigger to move to the next state of the user device; and
   adding the at least one task to the workflow record after identifying the trigger,
   wherein the current state is determined by the earliest received voice command and associated text command or a voice command received from the user device that has not been associated with at least one task, the next state is determined by identifying a task intended to follow the current state from the database or another database, and the trigger comprises a dialogue of interest related to the next state.

13. The method of claim 10, wherein determining the duration of the at least one task comprises identifying a text command or a voice command received from the user device in the first dialogue-stream associated with a start of the at least one task in the database or another database, identifying a text command or a voice command received from the user device in the first dialogue-stream associated with an end of the at least one task in the database or another database and determining a time between the start of the at least one task and the end of the at least one task.

14. The method of claim 10, further comprising:
   creating at least one alarm associated with the at least one task, wherein the alarm is configured to notify the supervisor device that the particular user has exceeded a maximum duration of the at least one task by causing an indication to be transmitted to the supervisor device when the duration of the at least one task exceeds the maximum duration of the at least one task in the workflow record.

15. The method of claim 10, further comprising:
   causing the workflow record for the particular user to be transmitted to the supervisor device, wherein the supervisor device is controlled by a supervisor of the particular user.

16. The method of claim 10, further comprising:
   receiving a plurality of dialogue-streams from a plurality of user devices, wherein each dialogue-stream comprises a plurality of text commands and a time associated with each text command, the plurality of text commands formed by transforming a plurality of voice commands into the plurality of text commands by converting audio signals associated with the plurality of voice commands to one or more points in data that are stored in the database or another database;
   creating a plurality of workflow records for a plurality of users by identifying at least one task for at least one voice command in each of the plurality of workflow records and determining a duration of each task of each workflow record of the plurality of workflow records; and
   comparing the duration of each task of each workflow record of the plurality of workflow records.

17. The method of claim 16, further comprising:
   filtering the plurality of workflow records for a single task; and
   determining at least one of an average duration of the single task over the plurality of workflow records, a minimum duration of the single task over the plurality of workflow records, or a maximum duration of the single task over the plurality of workflow records.

18. The method of claim 17, further comprising:
   creating at least one alarm associated with the single task, wherein the alarm is configured to notify the supervisor device that at least one user has exceeded a set duration of the single task by causing an indication to be transmitted to the supervisor device when the duration of the single task exceeds the set duration in the workflow record of the at least one user.

19. The method of claim 18, further comprising causing the at least one alarm to be transmitted to the user device.

20. A method of identifying inactive workers in a workplace, the method comprising:
   receiving a workflow record from a user device or a server, wherein the workflow record comprises a plurality of text commands and a time associated with each text command, the plurality of text commands formed by transforming a plurality of voice commands into the plurality of text commands by converting audio signals associated with the plurality of voice commands to one or more points in data that are stored in a database, wherein a first dialogue-stream includes the plurality of text commands, one or more tags are included in the first dialogue-stream and are associated with the plurality of text commands of the first dialogue-stream, each of the one or more tags of the first dialogue-stream indicates that an associated text command of the first dialogue-stream originated from a user of the user device as opposed to the user device, the first dialogue-stream is filtered to create a second dialogue stream by recognizing the one or more tags of the first dialogue stream and removing items in the first dialogue-stream that are not associated with the one or more tags to create the second dialogue-stream, and the workflow record is created from the second dialogue-stream, and wherein the workflow record is used to:
      determine a time duration between adjacent text commands in the workflow record associated with at least one task of a plurality of tasks,
      determine a rate of interaction of the user with the user device based on the time duration between the adjacent text commands in the workflow record;
      determine an average duration of the plurality of tasks associated with the plurality of voice commands by averaging a duration of each task over a statistically significant number of repetitions of the task; and
      in response to determining that the rate of interaction is less than a threshold associated with the at least one task and the average duration exceeds a set duration, sending a notification to a supervisor device, and
      initiating an action to improve the workflow record and incorporating at least one note to the workflow record recording the initiated action.

21. The method of claim 20, wherein the workflow record comprises a plurality of tasks associated with the plurality of text commands and each of the plurality of tasks is associated with a duration of the respective task.

22. The method of claim 20, further comprising acknowledging receipt of the workflow record by transmitting an indication to the user device or server from which the workflow record was received, the indication indicating that the workflow record was received.

23. The method of claim 20, wherein a set duration is determined by calculating an average duration of the task as performed over a statistically significant number of repetitions of the task.

24. The method of claim 20, wherein the action to improve the workflow record comprises notifying the user that the user is inactive by causing an indication to be transmitted to the user device operated by the user, the indication indicating that the user is inactive.

25. The method of claim 20, wherein the action to improve the workflow record comprises requesting additional materials, workers, or a combination thereof to perform the task by causing an indication to be transmitted to a server, the indication indicating that additional materials, workers, or a combination thereof are needed to perform the task.

* * * * *